US009446698B2

(12) United States Patent
Ushiyama (10) Patent No.: US 9,446,698 B2
(45) Date of Patent: Sep. 20, 2016

(54) VEHICLE SEAT
(71) Applicant: TOYOTA BOSHOKU KABUSHIKI KAISHA, Aichi-ken (JP)
(72) Inventor: Takeshi Ushiyama, Toyota (JP)
(73) Assignee: TOYOTA BOSHOKU KABUSHIKI KAISHA, Aichi-Ken (JP)
( * ) Notice: Subject to any disclaimer, the term of this patent is extended or adjusted under 35 U.S.C. 154(b) by 0 days.
(21) Appl. No.: 14/693,123
(22) Filed: Apr. 22, 2015
(65) Prior Publication Data
US 2015/0307011 A1 Oct. 29, 2015
(30) Foreign Application Priority Data Apr. 25, 2014 (JP) ................ 2014-091085

(51) Int. Cl.
| | |
|---|---|
| *B60N 2/72* | (2006.01) |
| *B60N 2/06* | (2006.01) |
| *B60N 2/07* | (2006.01) |
| *B60N 2/64* | (2006.01) |
| *B61D 33/00* | (2006.01) |
| *B64D 11/06* | (2006.01) |
| *B60N 2/58* | (2006.01) |
| *B60N 2/60* | (2006.01) |
| *B60N 2/68* | (2006.01) |
| *B60N 2/70* | (2006.01) |
| *A47C 31/02* | (2006.01) |
| *B63B 29/04* | (2006.01) |

(52) U.S. Cl.
CPC . *B60N 2/72* (2013.01); *B60N 2/06* (2013.01); *B60N 2/0705* (2013.01); *B60N 2/0715* (2013.01); *B60N 2/5825* (2013.01); *B60N 2/6009* (2013.01); *B60N 2/646* (2013.01); *B60N 2/68* (2013.01); *B60N 2/7094* (2013.01); *B61D 33/0035* (2013.01); *B64D 11/06* (2013.01); *A47C 31/023* (2013.01); *B63B 2029/043* (2013.01)
(58) Field of Classification Search
CPC ............ A47C 31/023; B60N 2/5825

USPC ............. 297/218.1, 218.3, 218, 5, 228.13
See application file for complete search history.

(56) References Cited

U.S. PATENT DOCUMENTS

| | | | | |
|---|---|---|---|---|
| 1,419,270 A | * | 6/1922 | King ............... | B60N 2/7041 5/409 |
| 2,661,051 A | * | 12/1953 | McCormick ...... | B60N 2/7041 297/452.38 |
| 4,564,239 A | * | 1/1986 | Akimoto ........... | B60N 2/585 297/452.52 |
| 4,740,035 A | * | 4/1988 | Kazaoka ........... | B60N 2/66 297/218.1 |
| 5,560,677 A | * | 10/1996 | Cykana ............. | B60N 2/5825 297/218.3 |
| 5,718,478 A | * | 2/1998 | Allison ............. | B60N 2/0705 297/218.1 |
| 5,820,213 A | * | 10/1998 | Severinski ........ | A47C 31/023 24/336 |
| 5,879,051 A | * | 3/1999 | Cozzani ............ | A47C 31/023 297/218.1 |

(Continued)

FOREIGN PATENT DOCUMENTS

JP 2013-226932 11/2013

*Primary Examiner* — Syed A Islam
(74) *Attorney, Agent, or Firm* — Greenblum & Bernstein, P.L.C.

(57) ABSTRACT

The invention relates to a vehicle seat, wherein a cushion cover that covers a seat cushion is provided to extend towards a floor along a side portion of the seat cushion facing a central control station, a hook which engages with the cushion cover at a cushion frame is provided on a portion of the cushion cover interposed between a cushion frame and the central control station, and a tab is provided on the cushion frame in order to engage with the hook, the tab being provided on a portion of the cushion frame facing the central control station.

6 Claims, 8 Drawing Sheets

(56) References Cited

U.S. PATENT DOCUMENTS

| | | | | |
|---|---|---|---|---|
| 6,745,444 B2 * | 6/2004 | Moilanen | ............ | B60N 2/5825 297/218.5 |
| 7,255,404 B2 * | 8/2007 | Neale | .................. | B60N 2/5816 297/218.1 |
| 7,891,735 B2 * | 2/2011 | Oku | ..................... | B60N 2/5825 297/218.3 |
| 2008/0174159 A1 * | 7/2008 | Kojima | ................ | B60N 2/5825 297/218.3 |

* cited by examiner

VEHICLE SEAT

INCORPORATION BY REFERENCE

The disclosure of Japanese Patent Application No. 2014-091085 filed on Apr. 25, 2014 including the specification, drawings and abstract is incorporated herein by reference in its entirety.

BACKGROUND OF THE INVENTION

1. Field of the Invention

The invention relates to a seat carried on a vehicle such as an automobile, an airplane, a ship and an electric train.

2. Description of Related Art

Figure 8:
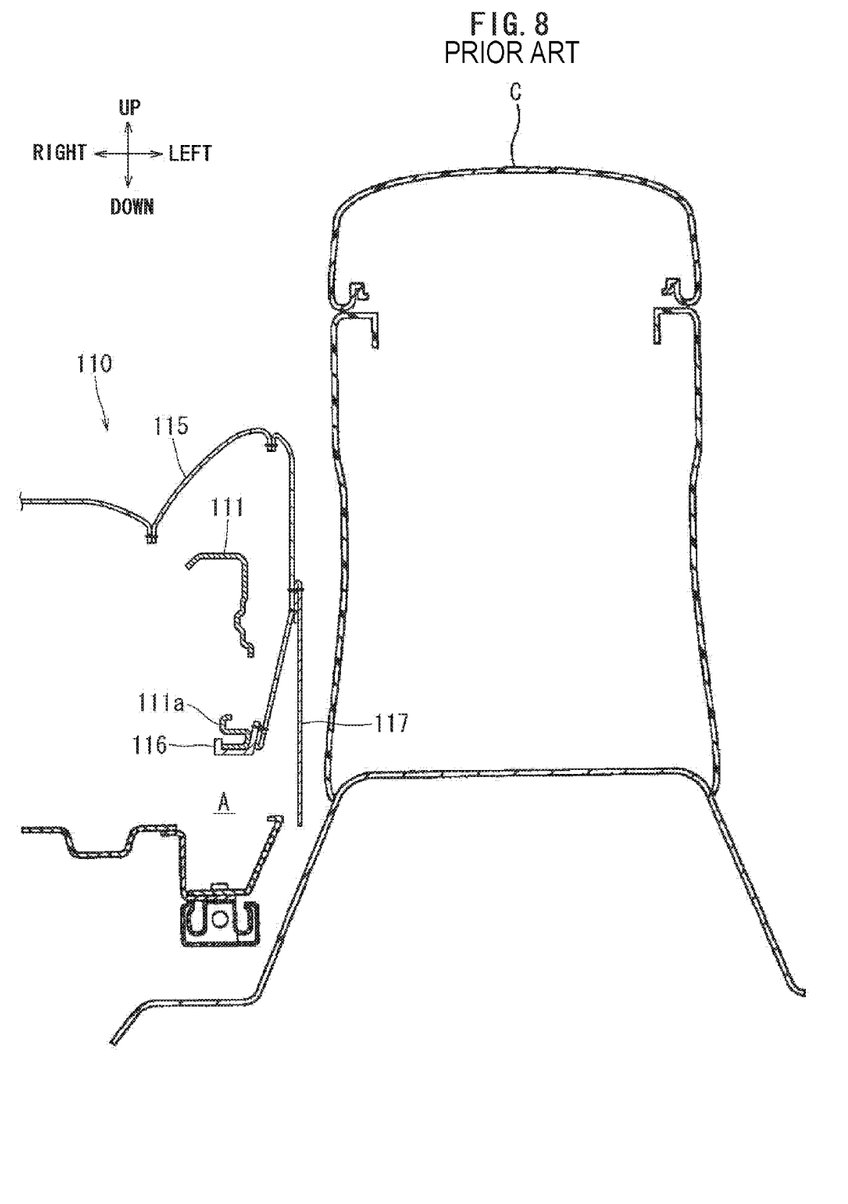
FIG. 8 is perpendicularly lateral sectional view of the seat cushion according to the related art of the invention.

As shown in FIG. 8, in a front seat for an automobile, in order to prevent small items from falling from a gap between a seat cushion 110 and a central control station C towards an action area A of a lift mechanism (not shown) of the seat cushion 110, a cover member 117 hanging towards the lower side of the seat cushion 110 is provided on the side portion of the seat cushion 110 so as to cover the gap (see Japanese Patent Application Publication No. 2013-226932 (JP 2013-226932 A)).

In this case, the seat cushion 110 comprises a cushion frame 111 and a cushion cover 115 which covers an outer side of a cushion frame 111 that serves as a base body of the vehicle seat such that a soft cushion (not shown) is interposed between the cushion frame 111 and the cushion cover 115. The cushion cover 115 is integrated with the cushion frame 111 by engaging a hook 116 with a lower end portion 111*a* of the cushion frame 111. At this time, the lower end portion 111*a* of the cushion frame 111 is located lower than the position of the cushion cover 115 on the side of the central control station C, and is located on the inner side of the seat cushion 110. Thus, the position of the hook 116 also is the same position, and the lower end portion of the cushion cover 115 is bent to be separated from the central control station C. Thus, the action area A of the lift mechanism on the lower portion of the seat cushion 110 is opened on the side of the central control station C, and small items can fall easily. As a countermeasure, in the invention of JP 2013-226932 A, the action area A is closed on the side of the central control station C by stitching the cover member 117 on the cushion cover 115.

However, according to the vehicle seat described in JP 2013-226932 A, since the cover member 117 is newly provided, there exists a problem that the manufacture cost rises. For example, the time for trimming the cover member 117 is unnecessarily spent. Moreover, the time for stitching the cover member 117 on the cushion cover 115 is also unnecessarily spent.

SUMMARY OF THE INVENTION

An object of the invention is to inhibit, in a vehicle seat which is provided with a structural body such as a central control station on a side of a seat cushion, falling of small items from a gap on the side of the seat cushion and the manufacture cost of the seat cushion by avoiding formation of such gap, from which the small items can fall, on the side of the seat cushion facing the structural body.

An aspect of the invention relates to a vehicle seat, which is provided with a structural body such as a central control station on a side of a seat cushion, wherein a cushion cover that covers the seat cushion is provided to extend towards a floor along a side portion of the seat cushion facing the structural body, a hook which engages with the cushion cover at a cushion frame is provided on a portion of the cushion cover interposed between the cushion frame and the structural body, and a tab which engages with the hook is provided on an outer peripheral side of a portion the cushion frame facing the structural body.

According to the aspect, the tab is provided on the portion of the cushion frame facing the structural body, so the position where the hook engages with the tab becomes a position close to the structural body, and the cushion cover is arranged on a side close to the structural body. Thus, the lower portion of the cushion frame is easily covered by the cushion cover, which can inhibit the falling of the small items from the side portion of the cushion frame towards the lower portion of the cushion frame. At this time, the side portion of the cushion frame is covered by the cushion cover itself, and there is no need to newly provide another cover member, which can inhibit the manufacture cost of the seat cushion.

The portion of the cushion frame facing the structural body refer to the portion facing the structural body among plural portions comprising whole surface of the cushion frame.

In the aspect of the invention, the cushion cover may haven an opening for an operation of engaging the hook with the tab at a position of the cushion cover corresponding to the hook.

The hook is provided on the inner surface side of the cushion cover, and thus will not be exposed to the outside, so that the operation of engaging the hook with the tab is to be blindly performed, and the operability is bad. According to the aspect of the invention, the hook is exposed to the outside through the opening, so the operator directly contacts the hook while observing the hook to perform the engaging operation, which can make the operability be good.

In the aspect of the invention, the cushion cover may has a cap to open and close the opening.

According to the aspect of the invention, since the opening is covered by the cap in normal times, falling of the small items towards the lower portion of the cushion frame through the opening can be suppressed , and it can prevent the hook from being seen through the opening so as to make the appearance be good. As a result, the opening can be enlarged, and the operability described in the aspect can be further improved.

In the aspect of the invention, the tab may protrude from an side surface of the cushion frame towards the structural body side.

According to the aspect, since the tab protrudes from the side surface of the cushion frame towards the structural body side, the position where the hook is engaged can be biased towards the structural body side, and the lower portion of the cushion frame is easily covered by the cushion cover, which can suppresses the falling of the small items from the side portion of the cushion frame towards the lower portion of the cushion frame.

In the aspect of the invention, the cushion frame may be configured to move relative to the floor along the structural body side via a slide rail, and the cushion frame may be arranged to be biased towards the structural body side relative to the slide rail.

According to the aspect, the cushion frame is arranged to be biased towards the structural body side relative to the slide rail, so the position where the hook is engaged can be biased towards the structural body side, and the lower portion of the cushion frame is easily covered by the cushion cover, which can suppress the falling of the small items from the side portion of the cushion frame towards the lower portion of the cushion frame.

In the aspect, the portion of the cushion frame facing the structural body may be a plate-shaped body, which has its plate surface facing the structural body side, and the tab may be provided on the plate surface.

According to the aspect, since the tab is provided on the plate surface of the plate-shaped body facing the structural body side, as compared with a structure where the tab is provided on the lower end portion of the plate-shaped body, the position where the hook is engaged with the tab becomes a position close to the structural body, and the cushion cover is arranged on a side close to the structural body. Thus, an effect the same as that achieved by the first invention can be achieved.

Another aspect of the invention relates to a vehicle seat, which is provided with a structural body such as a central control station on a side of a seat cushion, wherein a piece of cushion cover which covers the seat cushion is provided to extend in the up-down direction of the vehicle along a side portion of the seat cushion facing the structural body, and a hook is provided midway through the cushion cover in the up-down direction of the vehicle and on an inner surface side of a portion of the cushion cover facing the structural body, and a tab which engages with the hook is provided on the cushion frame.

In the other aspect, the cushion frame may configured to move in the front-rear direction of the vehicle via a slide rail arranged on the vehicle floor, and a leading end of the cushion cover in the up-down direction of the vehicle is arranged in a position having its horizontal height being less than the height of the upper surface of the slide rail.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

FIGS. 1-7 show one embodiment of the invention. This embodiment shows an example of applying the invention to a front seat for an automobile (hereinafter referred to as the seat). In the figures, the various directions of the seat fixed to the floor of the automobile are indicated by arrows. In the descriptions below, the depictions of the directions are given on the basis of those directions.

Figure 1:
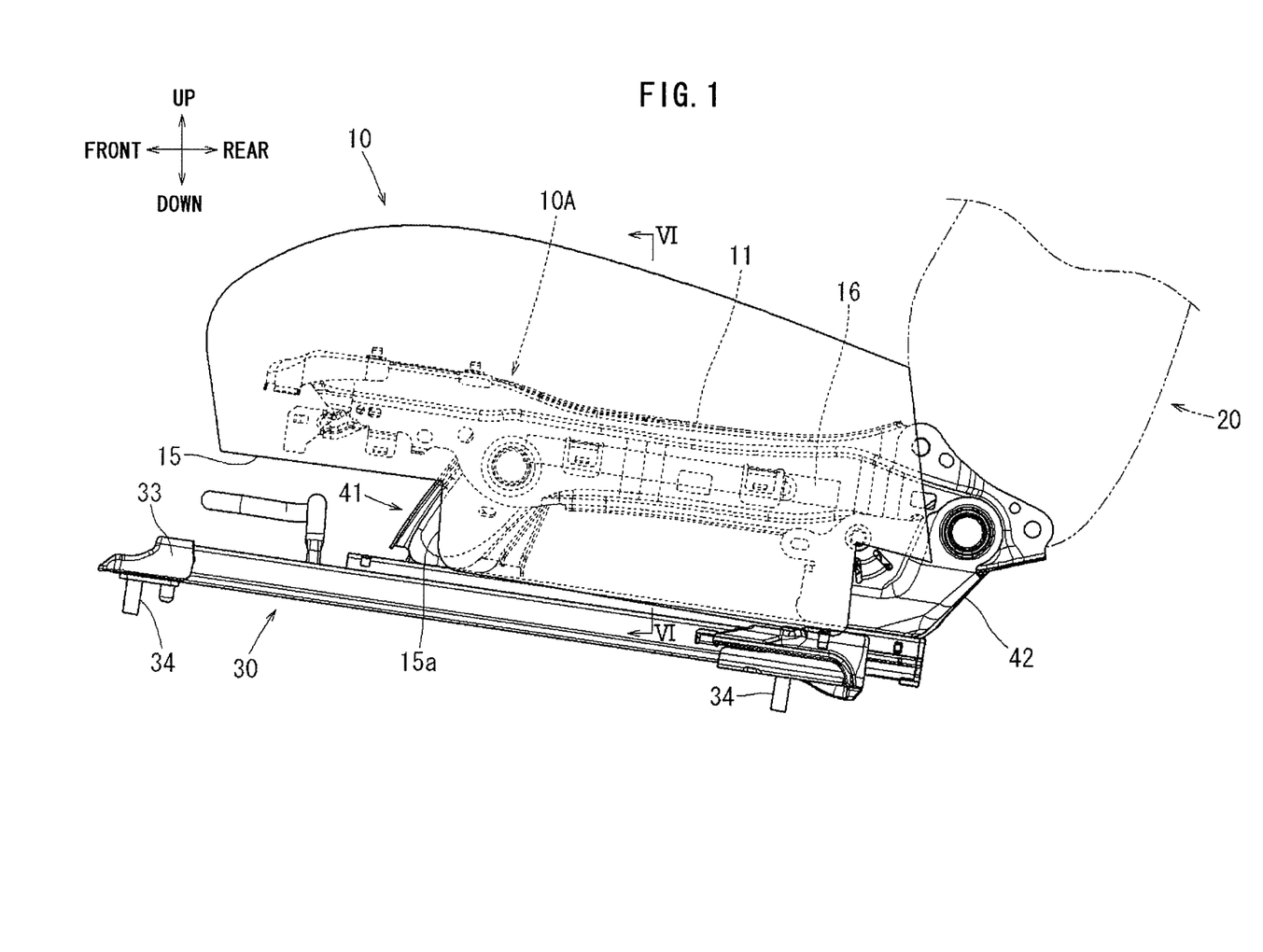
FIG. 1 is a side view of a front seat for an automobile according to one embodiment of the invention.
Figure 2:
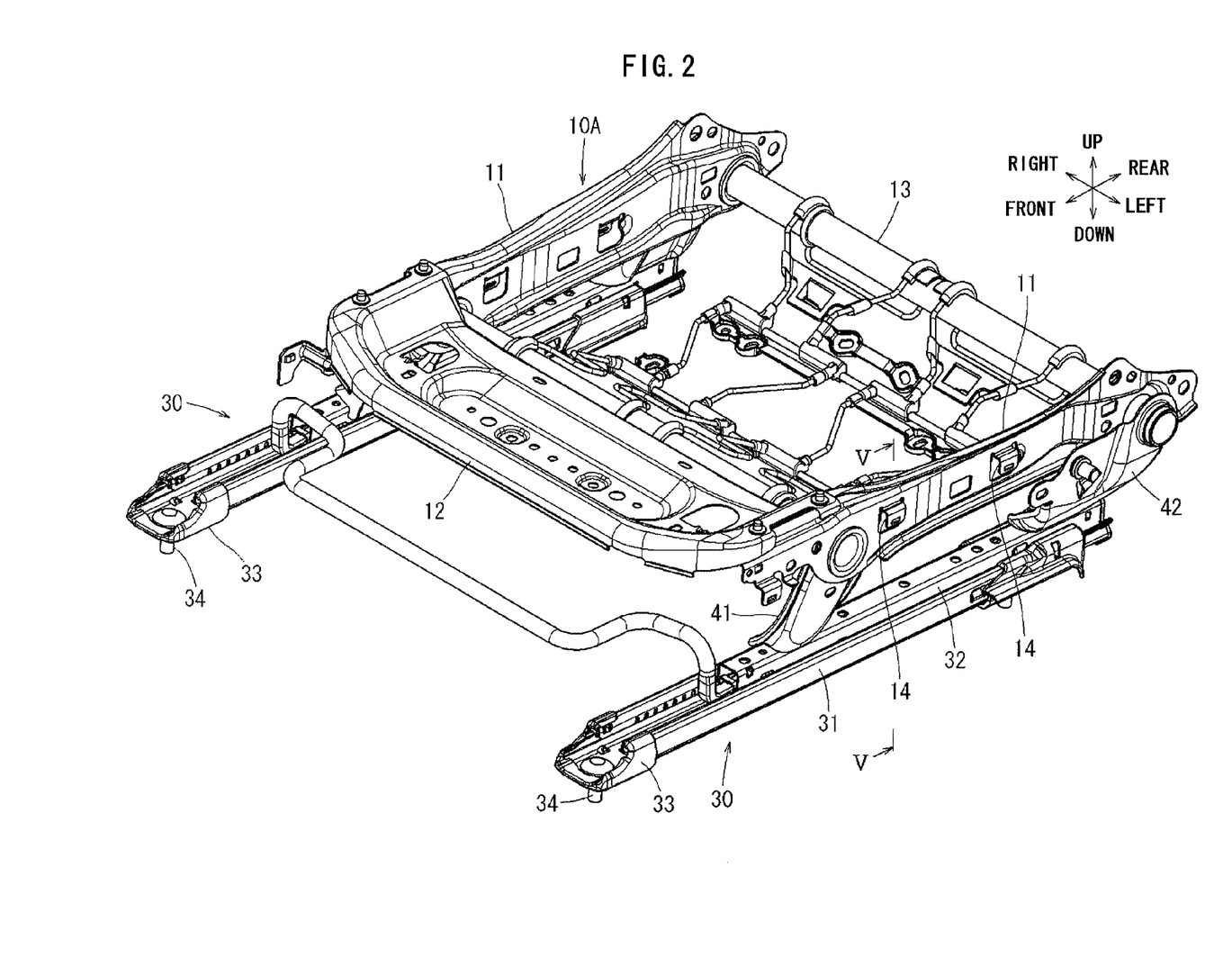
FIG. 2 is a perspective view from one direction of the cushion frame according to the above embodiment.
Figure 3:
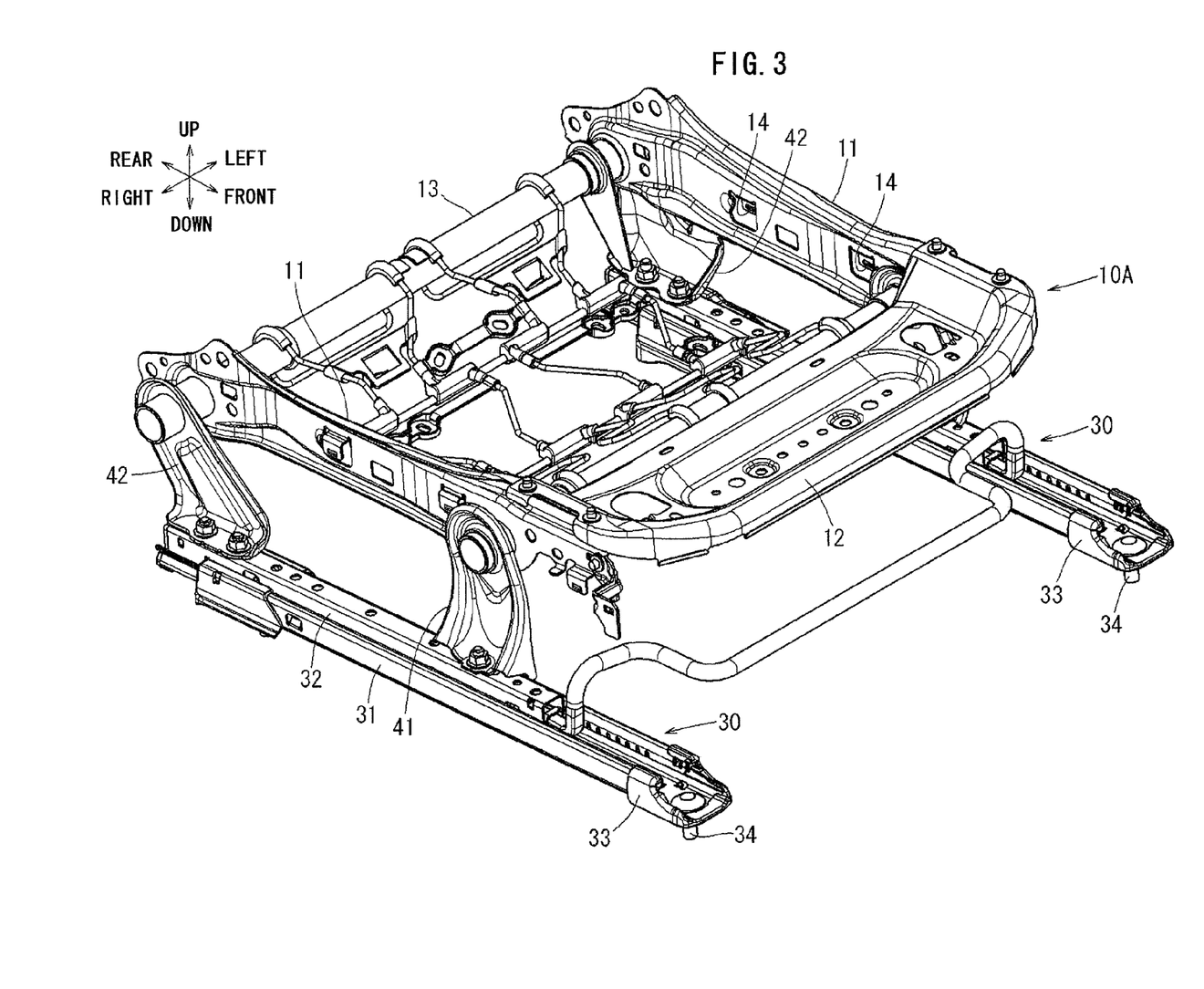
FIG. 3 is a perspective view from another direction of the cushion frame according to the above embodiment.
Figure 4:
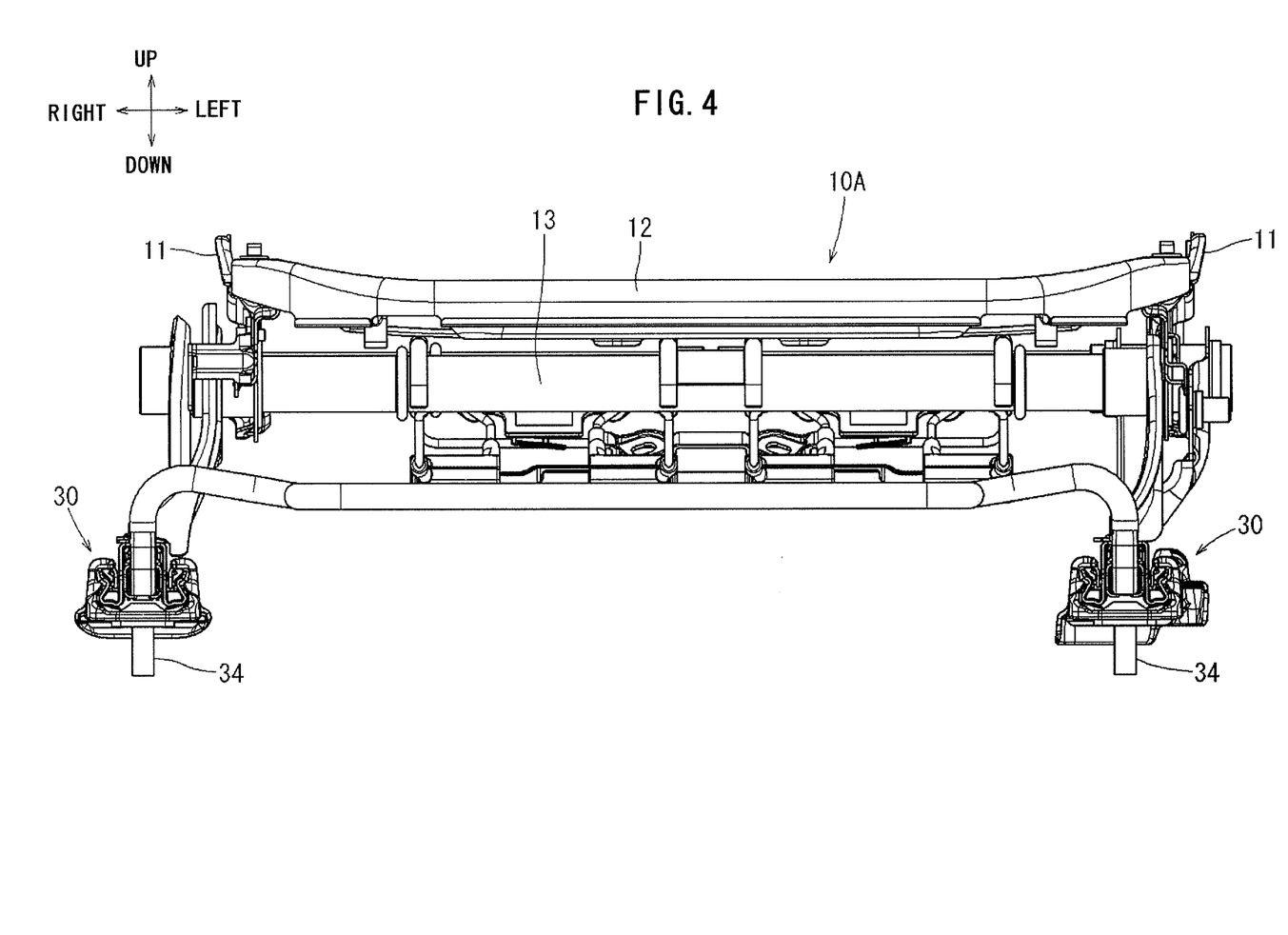
FIG. 4 is a front view of the cushion frame according to the above embodiment.

As shown in FIG. 1, the seat mainly consists of a seat cushion 10 that forms a seat portion and a seatback 20 that forms a back. The seat cushion 10 is integrated with a cushion cover 15 by covering a cushion cover 15 on an outer side of a cushion frame 10A such that a soft cushion (not shown) is interposed between the cushion frame 10A and the cushion cover 15. As shown in FIGS. 2-5, the cushion frame 10A is formed by assembling a front panel 12 in the front and a back pipe 13 at the rear to side frames 11 on the left and right. The side frame 11 is formed by punching a metal plate (corresponding to the plate-shaped body in the invention) with a specified strength. Tabs 14 are integrally provided on the outer side surface of the side frame 11.

A pair of slide rails 30 on the left and right are provided on the floor (not shown) of the automobile below the cushion frame 10A. Each of the slide rails 30 is formed by a lower rail 31 and an upper rail 32 as well known, the lower rail 31 is fixed to the floor by fixing screws 34 via a floor bracket 33, and the upper rail 32 is combined with the cushion frame 10A via a front leg 41 and a rear leg 42.

As can be known from FIGS. 2-5, the cushion frame 10A is arranged to be biased towards the left side relative to the positions of the slide rails 30. Thus, the manners of combining the front legs 41 with the upper rails 32 and the manners of combining the front legs 41 with the side frames 11 are respectively different on the left and right. Moreover, the shapes of the rear legs 42 are different from each other on the left and right.

Figure 6:
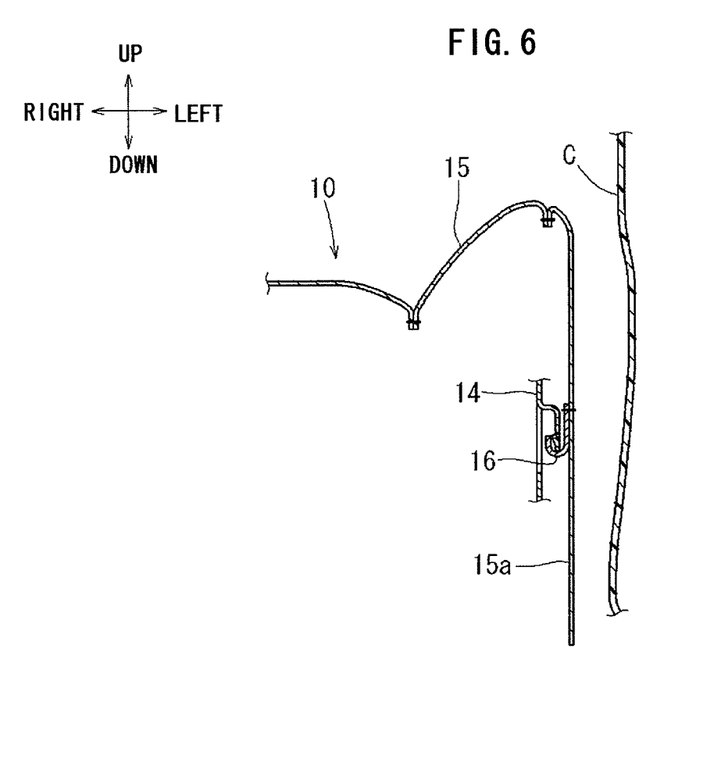
FIG. 6 is a sectional enlarged view from the VI-VI line in FIG. 1.

As shown in FIG. 6, a central control station C is arranged close to the left side of the seat cushion 10. The central control station C is the same as the existing central control station C shown in FIG. 8.

Figure 7:
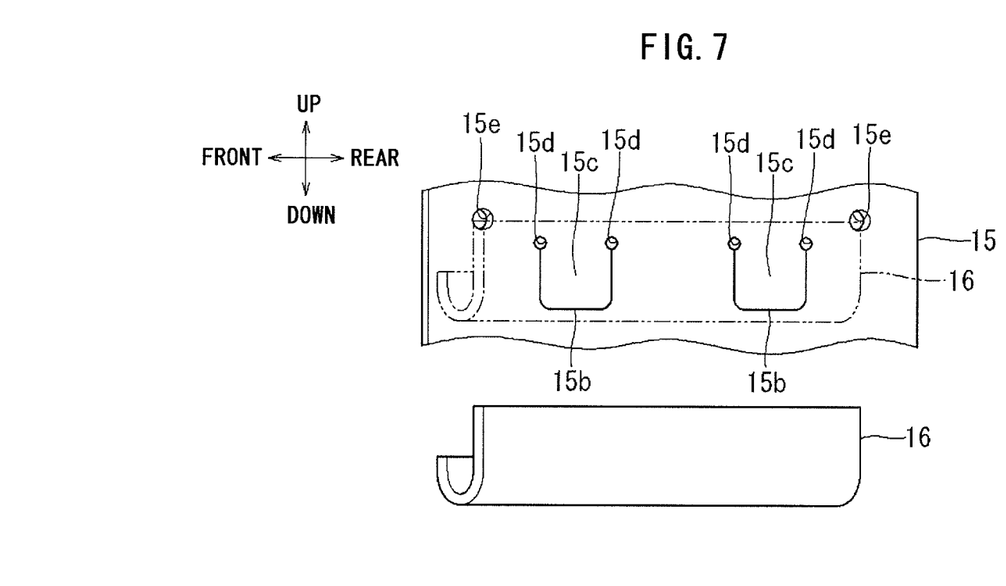
FIG. 7 is a perspective exploded view of the lower portion of the cushion cover according to the above embodiment.

As shown in FIGS. 1, 6 and 7, the cushion cover 15 extends downwardly towards the floor in a position corresponding to the central control station C on the left side of the seat cushion 10 to thereby form a lower portion 15a of the cushion cover. In a position midway through the cushion cover 15 in the up-down direction, a hook 16 that is long in the front-rear direction is stitched on the inner surface side of the cushion cover 15, and can be caught at a tab 14 that is formed on the side surface of the side frame 11.

Figure 5:
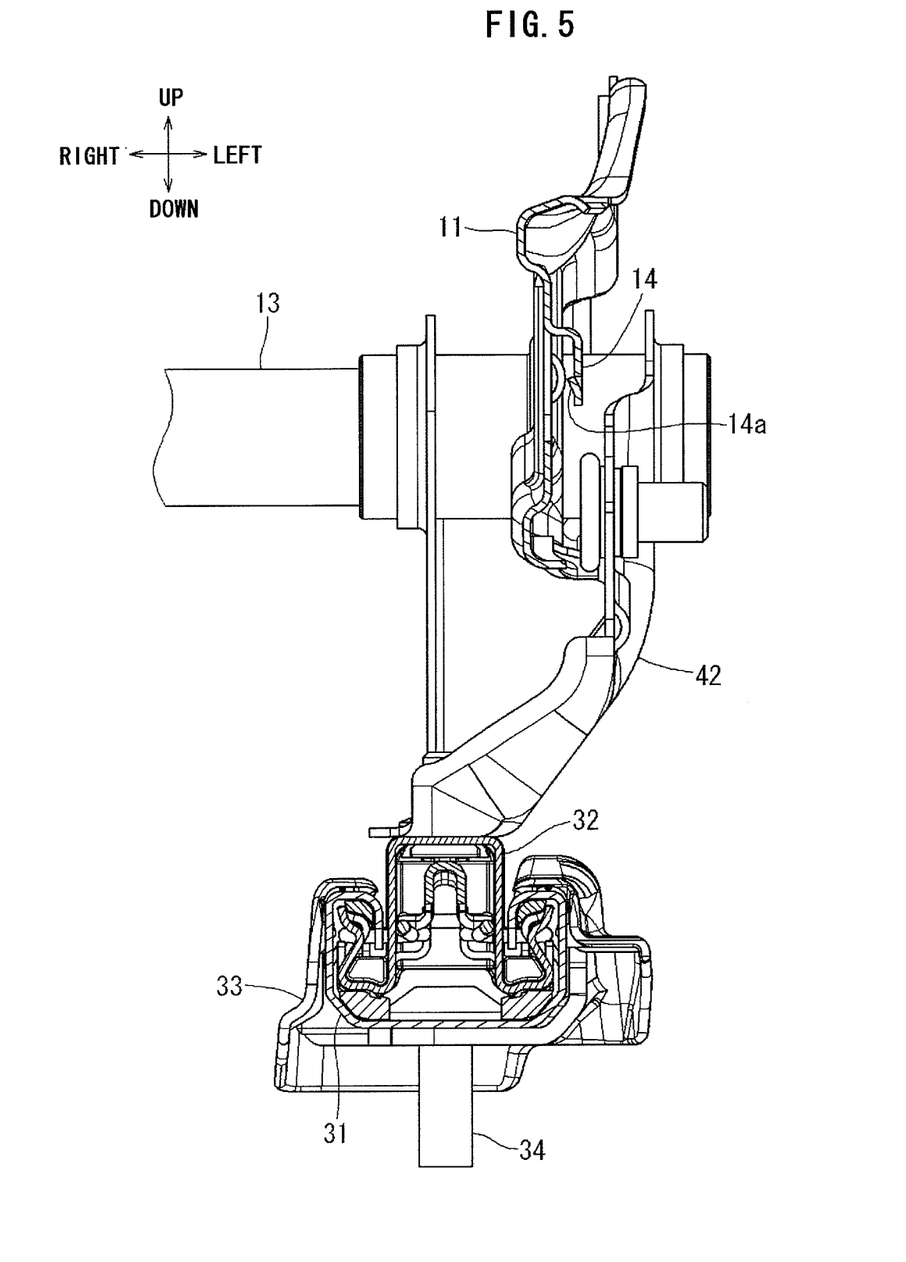
FIG. 5 is a sectional enlarged view from the V-V line in FIG. 2.

The tabs 14 are formed by bending two parts in front and rear positions of the surface of the side frame 11 toward the central control station C to have their leading ends extending downwards. As shown in FIGS. 5 and 6, the tab 14 is formed to protrude towards the side of the central control station C, and is bent at its leading end portion towards a direction opposite to the protruding direction of the tab 14 to form a pawl 14a. Correspondingly, as shown in FIG. 6, the hook 16 has its cross section being J-shaped, and is engaged at the leading end portion of the tab 14. When the hook 16 is engaged at the leading end portion of the tab 14, the leading end portion of the hook 16 is pressed by the pawl 14a towards the plate surface side of the side frame 11. The pawl 14a functions such that the hook 16 is not likely to drop in a state where the hook 16 is engaged at the tab 14.

FIG. 7 shows a part of the cushion cover 15 installed with the hook 16. Two positioning holes 15e which penetrates the cushion cover 15 are provided at a distance in front and rear positions of the cushion cover 15. The interval between the two positioning holes 15e is equal to the length of the hook 16 in the front-rear direction, and when the hook 16 is stitched on the cushion cover 15, as shown by the imaginary line in FIG. 7, the positioning of the hook 16 relative to the cushion cover 15 can be performed by embedding corners in the front and rear positions of the hook 16 in the respective positioning holes 15e. Moreover, two openings 15b are provided at a distance between the two positioning holes 15e in the front-rear direction. Each of the respective openings 15b is formed by opening a substantially U-shaped cut on the cushion cover 15. As a result, each of the openings 15b is provided with a cap 15c corresponding to the opening. Each of the openings 15b is set to one having a size allowing for entrance of the finger of the operator. Thus, when the hook 16 stitched on the cushion cover 15 is to be engaged at the tab 14, the cap 15c of each of the openings 15b is lifted to open the opening 15b such that the operator puts the finger in the opening to directly touch the hook 16 and hold the hook 16 in hand to thereby perform the engaging operation with a good operability. It should be noted that terminal holes 15b are formed at the respective terminals of the cut that forms the opening. Since the terminal holes 15d are formed at the respective terminals in this manner, even if the respective terminals undergo a splitting force when the finger is placed in the opening 15b, the terminals will not be easily split. Moreover, since the opening 15b is covered by the cap 15c in normal times, the falling of the small items towards the lower portion of the cushion frame 10A through the opening 15b can be suppressed, and it can prevent the hook 16 from being seen through the opening 15b so as to make the appearance be good. As a result, the opening 15b can be enlarged, and the effect of improving the operability produced by providing the opening can be further increased.

As mentioned above, in the above embodiment, the position where the hook 16 is engaged with the tab 14 is made to be close to the central control station C by biasing the cushion frame 10A towards the side of the central control station C, providing the tab 14 on a surface of the side frame 11 opposite to the central control station C, and forming the tab 14 to protrude towards the central control station C. Moreover, the lower portion 15a of the seat cover extends towards the floor. Thus, the cushion cover 15 is prevented from being bent in the direction in which it is separated from the central control station C below the seat cushion 10, and the gap on the lower portion of the seat cushion 10 is closed by the cushion cover 15. Thus, the falling of the small items from the gap on the lower portion of the seat cushion 10 can be suppressed. Moreover, since the cushion cover 15 will not be bent in the direction in which it is separated from the central control station C below the seat cushion 10, it is not required to additionally provide the cushion cover 15 with, for example, the cover member 117 for closing the area A as recited in the related art described with reference to FIG. 8, which can inhibit the manufacture cost.

Although a specific embodiment is described above, the invention is not limited to these appearances and structures, and various changes, additions or deletions can be made within the scope of not changing the gist of the invention. For example, with respect to the catching structure consisting of the hook and the tab, various structures can be adopted besides the structure recorded in the embodiment. Moreover, in the above embodiment, the invention is applied to a front seat for an automobile, but the invention can be also applied to a seat carried on an airplane, a vessel, an electric train and the like.

What is claimed is:

1. A vehicle seat configured to be mounted adjacent to a structural body in a vehicle, the vehicle seat comprising:
   a seat cushion;
   a cushion cover that covers the seat cushion and when the vehicle seat is mounted in the vehicle, the cushion cover extends towards a floor of the vehicle along a side portion of the seat cushion facing the structural body;
   a hook provided on an inner surface side of a portion of the cushion cover, and when the vehicle seat is mounted in the vehicle, the portion of the cushion cover is interposed between a cushion frame and the structural body; and
   a tab provided on an outer peripheral side of a portion of the cushion frame, and when the vehicle seat is mounted in the vehicle, the tab faces the structural body, and the tab is engageable with the hook, wherein
   when the hook and the tab are engaged, the portion of the cushion cover extends below the hook and the tab, and
   the cushion cover has an opening configured to permit access to the hook from an outer surface side of the portion of the cushion cover to permit the hook to be positioned for engagement with the tab.

2. The vehicle seat according to claim 1, wherein the cushion cover defines a cap extending over the opening, the cap being configured to selectively open and close the opening.

3. The vehicle seat according to claim 1, wherein the tab protrudes from a side surface of the cushion frame towards a structural body side of the vehicle seat.

4. The vehicle seat according to claim 1, wherein when the vehicle seat is mounted to the vehicle, the cushion frame is configured to move relative to the vehicle floor along a side surface of the structural body via a slide rail, and
   the cushion frame is arranged on the slide rail such that the cushion frame is positioned closer to a structural body side of the vehicle seat than the slide rail.

5. The vehicle seat according to claim 1, wherein the portion of the cushion frame configured to face the structural body is a plate-shaped body, which has a plate surface facing a structural body side of the vehicle seat, and the tab is provided on the plate surface.

6. The vehicle seat according to claim 1, wherein the cushion frame is configured to move in a front-rear direction of the vehicle via a slide rail configured to be arranged on the vehicle floor, and
   a leading end of the cushion cover in a up-down direction of the vehicle seat is arranged above an upper surface of the slide rail.

* * * * *